US012651028B2

(12) United States Patent
Helland

(10) Patent No.: US 12,651,028 B2
(45) Date of Patent: Jun. 9, 2026

(54) SIMILARITY INFORMATION IN SKIP LISTS

(71) Applicant: Salesforce, Inc., San Francisco, CA (US)

(72) Inventor: Patrick James Helland, San Rafael, CA (US)

(73) Assignee: Salesforce, Inc., San Francisco, CA (US)

( * ) Notice: Subject to any disclaimer, the term of this patent is extended or adjusted under 35 U.S.C. 154(b) by 26 days.

(21) Appl. No.: 18/424,002

(22) Filed: Jan. 26, 2024

(65) Prior Publication Data

US 2025/0245273 A1    Jul. 31, 2025

(51) Int. Cl.
| *G06F 16/95* | (2019.01) |
| *G06F 16/901* | (2019.01) |
| *G06F 16/951* | (2019.01) |

(52) U.S. Cl.
CPC ........ G06F 16/951 (2019.01); G06F 16/9014 (2019.01)

(58) Field of Classification Search
CPC .................................................. G06F 16/951
See application file for complete search history.

(56) References Cited

U.S. PATENT DOCUMENTS

| 7,831,624 | B2 | 11/2010 | Lubbers et al. | |
| 10,691,696 | B2 | 6/2020 | Helland et al. | |
| 2004/0054807 | A1* | 3/2004 | Harvey ................... | H04L 12/56 |
| | | | | 709/239 |
| 2010/0049935 | A1* | 2/2010 | Pichumani ........ | G06F 16/24568 |
| | | | | 711/E12.001 |

| 2011/0099506 | A1* | 4/2011 | Gargi ................... | G06F 3/0236 |
| | | | | 715/773 |
| 2017/0091244 | A1* | 3/2017 | Romanovskiy ..... | G06F 16/2272 |
| 2018/0157696 | A1* | 6/2018 | McKenney ......... | G06F 16/2343 |
| 2018/0217987 | A1* | 8/2018 | Helland ............ | G06F 16/24562 |
| 2018/0218023 | A1* | 8/2018 | Fanghaenel ......... | G06F 16/2343 |
| 2019/0205344 | A1* | 7/2019 | Gold ...................... | G06F 16/24 |

(Continued)

FOREIGN PATENT DOCUMENTS

KR        2023 0092443  A        6/2023

OTHER PUBLICATIONS

International Search Report and Written Opinion in PCT Appl. No. PCT/US2024/061053 mailed Mar. 19, 2025, 16 pages.

*Primary Examiner* — Mohammad S Rostami

(74) *Attorney, Agent, or Firm* — Kowert, Hood, Munyon, Rankin & Goetzel, P.C.; Mark D. Seegers; Dean M. Munyon

(57)        ABSTRACT

Techniques are disclosed that relate to skip lists. A computer system maintains a skip list having towers of varying depths and entries storing pointers to other towers. A first tower includes an entry at a particular depth storing a pointer to access an entry of a second tower. The pointer includes first similarity information indicating an amount of similarity between a key of the first tower and a key of the second tower. The computer system performs a traversal of the skip list for a search key. The computer system generates second similarity information indicating an amount of similarity between the first tower's key and the search key. Based on a comparison involving the first and second similarity information and without accessing the second tower to obtain information about its key, the computer system determines whether to traverse to the second tower using the pointer or descend the first tower.

18 Claims, 8 Drawing Sheets

(56)     References Cited

U.S. PATENT DOCUMENTS

| 2020/0320083 | A1* | 10/2020 | Helland | G06F 16/24562 |
| 2022/0245123 | A1* | 8/2022 | Helland | G06F 16/2308 |
| 2024/0126738 | A1* | 4/2024 | Bhola | G06F 16/2282 |
| 2025/0110782 | A1* | 4/2025 | Zuo | G06F 9/541 |

* cited by examiner

SIMILARITY INFORMATION IN SKIP LISTS

BACKGROUND

Technical Field

This disclosure relates generally to computer systems and, more specifically, to various mechanisms that pertain to traversing and managing skip lists.

Description of the Related Art

Enterprises routinely implement database management systems (or, simply "database systems") that enable users to store a collection of information in an organized manner that can be efficiently accessed and manipulated. In various cases, a database system implements a log-structured merge tree (LSM tree) having multiple levels that each store data in records as key-value pairs. The database system can include a persistent storage that houses the LSM tree and a database node having a local in-memory cache. During operation, the database node initially writes records into its in-memory cache before later flushing them to the persistent storage. As a part of flushing records, the database node writes the records into new files that are stored in one of the multiple levels of the LSM tree. Over time, those records are rewritten into new files stored in lower levels as the records are merged down the LSM tree.

DETAILED DESCRIPTION

Figure 1:
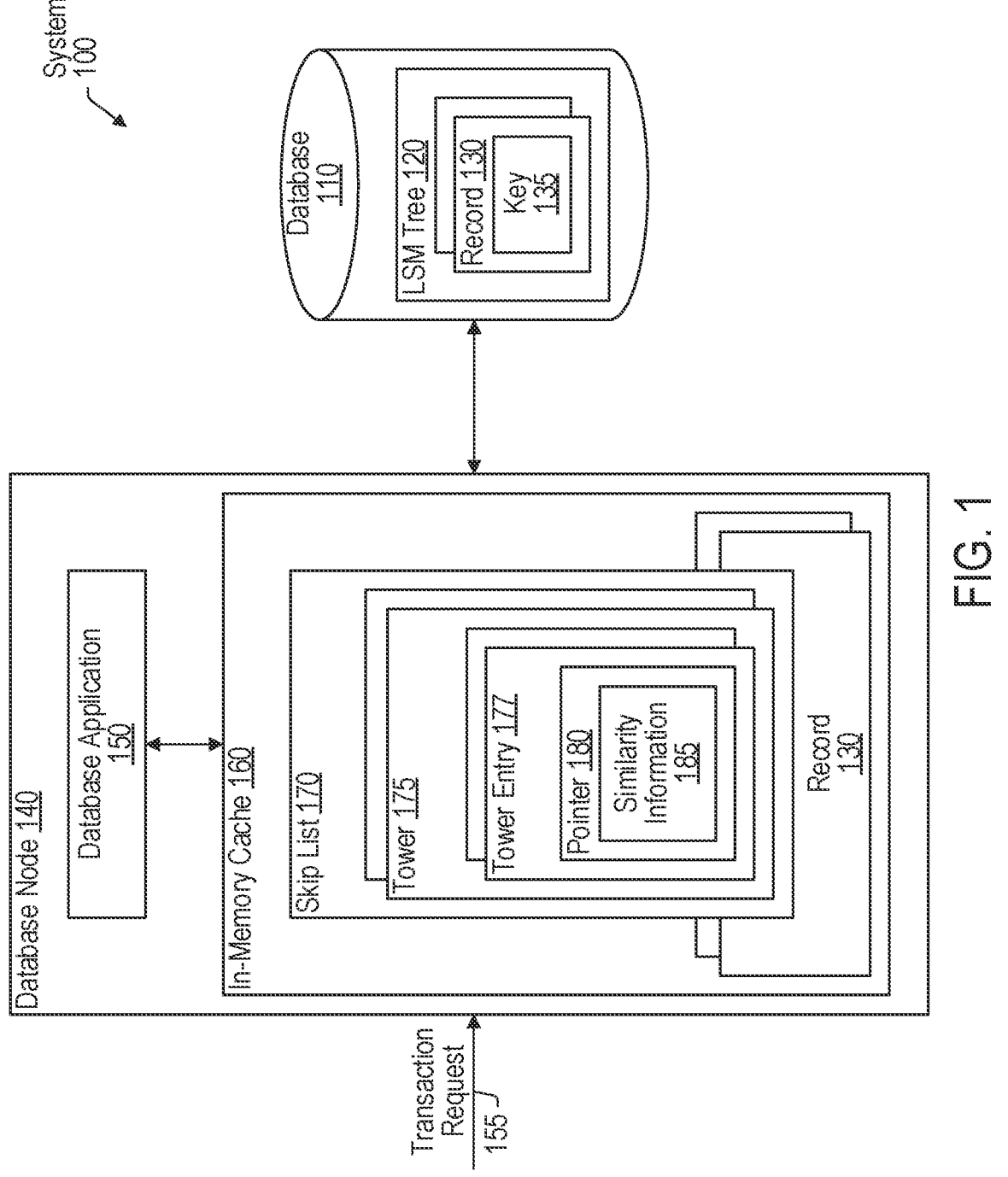
FIG. 1 is a block diagram illustrating example elements of a system having a database and a database application that utilizes a skip list as a part of managing that database, according to some embodiments.

Certain database systems manage databases that are built around an LSM tree in which database records are stored in files written to persistent storage. During its operation, a database node of such a database system may process database transactions that involve writing records to a local in-memory cache/buffer and then flushing the records from that in-memory cache to the LSM tree, where those records are "merged" down the tree over time by being copied from higher levels into lower levels. One requirement normally enforced on a database system that manages an LSM tree is that, when a group of records is written to a file in the LSM tree, those records have to be written in key-sorted order in that file. But records stored in the in-memory cache are not usually stored in key-sorted order, and thus locating records in key-sorted order to flush to a file in the LSM tree can be a time-consuming process. In order to access records in the in-memory cache in key-sorted order, a type of data structure referred to as a "skip list" can be employed. As used and described herein, a skip list refers to a data structure comprising a linked hierarchy of sequences of records, with each successive, lower sequence skipping over fewer elements than the previous sequence. Such structures can be implemented using records that store towers/stacks of pointers to successor records that make use of the property that, on average, the pointers on a N+1th level of the towers will skip over twice as many records as pointers on the Nth level of the towers. While skip lists are discussed in the context of database systems, skip lists are used in a variety of different applications, and the disclosed techniques of this disclosure can be applied to those skip lists.

Traversing the skip list to locate a record for a search key can involve moving from one tower to the next tower (via pointers) and descending levels of the towers. In order to determine whether to move from a first tower to a second tower or to descend a level of the first tower, a string comparison is performed between the search key and the key of the second tower, which is the key of the record that includes that second tower. If that search key is less than the key of the second tower, then the traversal descends a level of the first tower, otherwise the traversal advances to the second tower via a pointer in the first tower, remaining on the same level. The traversal then repeats this process until a record is either located or not. But there are various deficiencies to this approach. First, to perform the string comparison, the record containing the second tower has to be accessed to determine the key of the second tower. Second, a latch/lock is acquired as a part of the process of determining the key of the second tower and performing that string comparison, which can cause contention between multiple actors that are interacting with the records stored in the in-memory cache. Third, keys can be quite large strings and thus string comparisons can be costly operations that collectively add up, especially when a single traversal involves many string comparisons. This disclosure addresses, among other things, the technical problem of how to implement a skip list that overcomes at least one or more of these deficiencies.

In various embodiments described below, a system includes a database and a database node that writes database records for the database. The database node maintains a skip list that allows for records to be accessed in key-sorted order. The skip list comprises towers of varying depths and having entries storing pointers to other towers. Accordingly, a first tower can include an entry at a particular depth that stores a pointer that is usable to access an entry of a second tower at that same depth (or taller in some cases). In various embodiments, that pointer includes similarity information identifying an amount of similarity between the key of the first tower and the key of the second tower. That similarity information may take the form of an offset value code that identifies 1) the first byte (character) that differs between the keys of the first and second towers and 2) the value of the differing byte of the key of the second tower. As an example, if the key of the first tower is "ABBC" and the key of the second tower is "ABBD," then the offset value code is (4, D) in various embodiments—their fourth byte is different and the latter key's fourth byte is "D."

When performing a traversal of the skip list for a search key, in various embodiments, similarity information is generated based on the search key and the key of the current tower of the traversal (e.g., the first tower that is mentioned above) and then a comparison is performed between the newly-generated similarity information and the similarity information encoded in the pointer to the next tower (e.g., the second tower). Based on that comparison, the database node determines whether to advance the traversal to the next tower using the pointer or descend the current tower. If the alphabetic distance between the key of the current tower and the key of the next tower is greater than the alphabetic distance between the key of the current tower and the search key as indicated by the comparison, then the database node descends the current tower; otherwise, the database node advances to the next tower, in various embodiments. The database node may repeat this process until a record in the skip list corresponding to the search key is reached.

These techniques may be advantageous over prior approaches as they permit a system to determine whether to advance a skip list traversal to the next tower without having to access the record that contains the next tower in order to determine the key of the next tower. That is, since the similarity information between the keys of the current and next towers is stored in a pointer of the current tower and the similarity information can be used to determine whether to advance to the next tower, the system does not have to access the record containing the next tower. Further, since the record containing the next tower does not have to be accessed, a latch does not have to be acquired as a part of that process of determining the key of the next tower and performing the comparison, which reduces contention between multiple actors interacting with the records. Moreover, since similarity information can take the form of an offset value code, traversal of the skip list involves integer comparisons (i.e., comparisons between offset value codes) in place of string comparisons (i.e., comparisons between the search key and the key of the next tower). Thus, the computational cost of traversing the skip list is reduced.

Turning now to FIG. 1, a block diagram of a system 100 is shown. System 100 includes a set of components that may be implemented via hardware or a combination of hardware and software routines. In the illustrated embodiment, system 100 comprises a database 110 and a database node 140. As shown, database 110 includes an LSM tree 120 having records 130 with keys 135, and database node 140 includes a database application 150 and an in-memory cache 160. As further shown, in-memory cache 160 includes records 130 that collectively implement a skip list 170 having towers 175 with entries 177. Also as shown, entries 177 include pointers 180 comprising similarity information 185. In some embodiments, system 100 is implemented differently than shown. For example, skip list 170 may be stored separately from records 130, database 110 may store records 130 independent of LSM tree 120, etc.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and entities (e.g., a third-party system) that are associated with system 100. In various embodiments, system 100 is implemented using cloud infrastructure provided by a cloud provider. As such, database 110 and database node 140 may execute on and utilize the available cloud resources of that cloud infrastructure (e.g., computing resources, storage resources, etc.) to facilitate their operation. For example, program code executable to implement the components of database node 140 can be stored on a non-transitory computer-readable medium of server-based hardware included in a datacenter of the cloud provider and executed in a virtual machine hosted on the server-based hardware. In some cases, database node 140 may execute on a computing system of the cloud infrastructure without the assistance of a virtual machine or certain deployment technologies, such as containerization. In some embodiments, system 100 is implemented on local or private infrastructure as opposed to a public cloud.

Database 110, in various embodiments, is a collection of information that is organized in a manner that allows for access, storage, and/or manipulation of that information. Database 110 may include supporting software (e.g., storage nodes) that allows for database node 140 to carry out those operations (e.g., accessing, storing, etc.) on the information stored at database 110. In various embodiments, database 110 is implemented using a single or multiple storage devices that are connected together on a network (e.g., a storage attached network (SAN)) and configured to redundantly store information in order to prevent data loss. The storage devices may store data persistently and thus database 110 may serve as a persistent storage for system 100. Further, as discussed, components of system 100 may utilize the available cloud resources of a cloud infrastructure and thus the data of database 110 may be stored using a storage service provided by a cloud provider (e.g., Amazon S3®). In various embodiments, data that is written to database 110 by a database server 140 is accessible to other database servers 140 in a multi-node configuration. As depicted, database 110 includes LSM tree 120, which organizes at least a portion of the data that is managed by database node 140.

LSM tree 120, in various embodiments, is a data structure storing files (having records 130) in an organized manner that uses a level-based scheme. A record 130 can be a key-value pair comprising data and a corresponding key 135 that is usable to look up that record 130. For example, a record 130 may be a row in a database table, where that record 130 specifies values for one or more attributes associated with that database table. In various embodiments, records 130 are immutable once written. In order to update the values of a given record 130, database node 140 writes a new record 130 with the updated values that supersedes the older record 130. But that older record 130 may continue to persist in LSM tree 120. Records 130 may be written from in-memory cache 160 to database 110 in batches to files at the top level of LSM tree 120 and merged down the levels of LSM tree 120 over time. Records 130 that are written to a file in LSM 120 are written in key-sorted order in various embodiments. As a result, a file may be associated with a key range defined by the keys 135 of the records 130 included in that file. To be able to write out records 130 in key-sorted order in an efficient manner, database node 140 uses skip list 170.

Database node 140, in various embodiments, provides database services, such as data storage, data retrieval, and/or data manipulation. In various embodiments, database node 140 is software that is executable on hardware, while in some embodiments, it encompasses both the hardware and the software. The database services may be provided to other components in system 100 and/or to components external to system 100. For example, database node 140 may receive, via an established database connection, a transaction request 155 from an application node to perform a database transaction. A database transaction, in various embodiments, is a logical unit of work (e.g., a specified set of database statements) to be performed in relation to database 110. For example, processing a database transaction may include executing a SQL SELECT statement to select one or more rows from one or more tables. The contents of a row can be specified in a record 130, and thus database node 140 may return one or more records 130 corresponding to the one or more rows. Performing a database transaction can also include database node 140 writing data records 130 to database 110.

Database application 150, in various embodiments, is executable software that provides the database services of database node 140. Accordingly, database application 150 can receive transaction requests 155 (e.g., from an application node) and process them. In order to process a database transaction, database application 150 may execute one or more query plans defining respective sequences of steps to be executed in order to implement database statements of that database transaction. In various embodiments, database application 150 can access a definition of a query plan (e.g., from database 110), compile it into a form that can be executed, and store it in in-memory cache 160. In response to a request to execute a database statement, database application 150 may retrieve and execute the compiled form of the query plan that corresponds to that database statement. As part of handling a transaction request, a database application 150 may also execute user-defined functions to perform desired operations-those functions might also be compiled and stored in in-memory cache 160. Furthermore, database application 150 may process transactions according to guiding principles that ensure transactional consistency, such as ACID (Atomicity, Consistency, Isolation, and Durability).

In-memory cache 160, in various embodiments, is a buffer that stores data in memory (e.g., random access memory) of database node 140. HBase™ memstore is one example of in-memory cache 160. In various embodiments, database application 150 initially writes records 130 to in-memory cache 160. As in-memory cache 160 becomes full and/or at particular points in time, database application 150 may flush records 130 from in-memory cache 160 to database 110, where those records 130 can be stored in a set of files that are included in the top level of LSM tree 120. As discussed, in various embodiments, records 130 are written to a file in tree 120 in key-sorted order. In order to access records 130 of in-memory cache 160 in key-sorted order, database application 150 can use skip list 170. Skip list 170 may also be used to locate records 130 as part of processing a database transaction (e.g., return records 130 that fall within a particular key range).

Skip list 170, in various embodiments, is a data structure comprising a linked hierarchy of sequences of records 130, with each successive, lower sequence skipping over fewer records 130 than the prior sequence. In particular, skip list 170 comprises a sequence of towers 175 of varying depths and having tower entries 177 storing pointers 180 to other towers 175. A tower 175, in various embodiments, is a structure having a set of levels that represent its depth. Each level of that tower 175 may include an entry 177 that stores a pointer 180 to the next tower 175 in the sequence of towers 175 having an entry 177 at that level, skipping over smaller towers 175. At least a portion of records 130 of in-memory cache 160 collectively implement skip list 170 by storing respective towers 175. An example of skip list 170 is discussed in greater detail with respect to FIG. 2A.

A pointer 180, in various embodiments, is information that is usable to access a tower 175 (or more specifically, the record 130 storing that tower 175) that is pointed to by the pointer 180. A pointer 180 may directly point to the record 130 storing a tower 175 or indirectly point to that record 130 by pointing to another location (e.g., a hash bucket) that in turn points to that record 130. Examples of indirect pointers 180 are discussed in more detail with respect to FIG. 2B. In addition to storing pointer information, pointers 180 store similarity information 185. Similarity information 185, in various embodiments, indicates an amount of similarity between the key 135 of the record 130 containing the tower 175 that includes that similarity information 185 and the key 135 of the record 130 storing the tower 175 pointed to by the pointer 180 that includes that similarity information 185. An example of similarity information 185 is discussed in more detail with respect to FIG. 3B. In various embodiments, the amount of similarity defines or represents the alphabetic distance between two keys. Examples of alphabetic distances are discussed in more detail with respect to FIG. 3A.

When traversing skip list 170 (e.g., to access certain records 130 in key-sorted order), in various embodiments, database application 150 compares the similarity information 185 of a pointer 180 with similarity information 185 that is derived from a search key 135 and the key 135 of the current tower 175. As discussed in greater detail with respect to FIG. 4, based on the comparison, database application 150 can determine whether to advance to the next applicable tower 175 or to descend the current tower 175. Accordingly, through a series of comparisons, database application 150 may traverse across and down through skip list 170 to locate a record 130 matching the search key 135. In the case of accessing multiple records 130 in key-sorted order, database application 150 may use a pointer of the located record 130 to access the record 130 that is sequentially next in the order. That record 130 may also store a pointer to the next record 130, which in turn points to the next record 130 and so on. As such, database application 150 can traverse through a series of records 130 in key-sorted order.

Figure 2A:
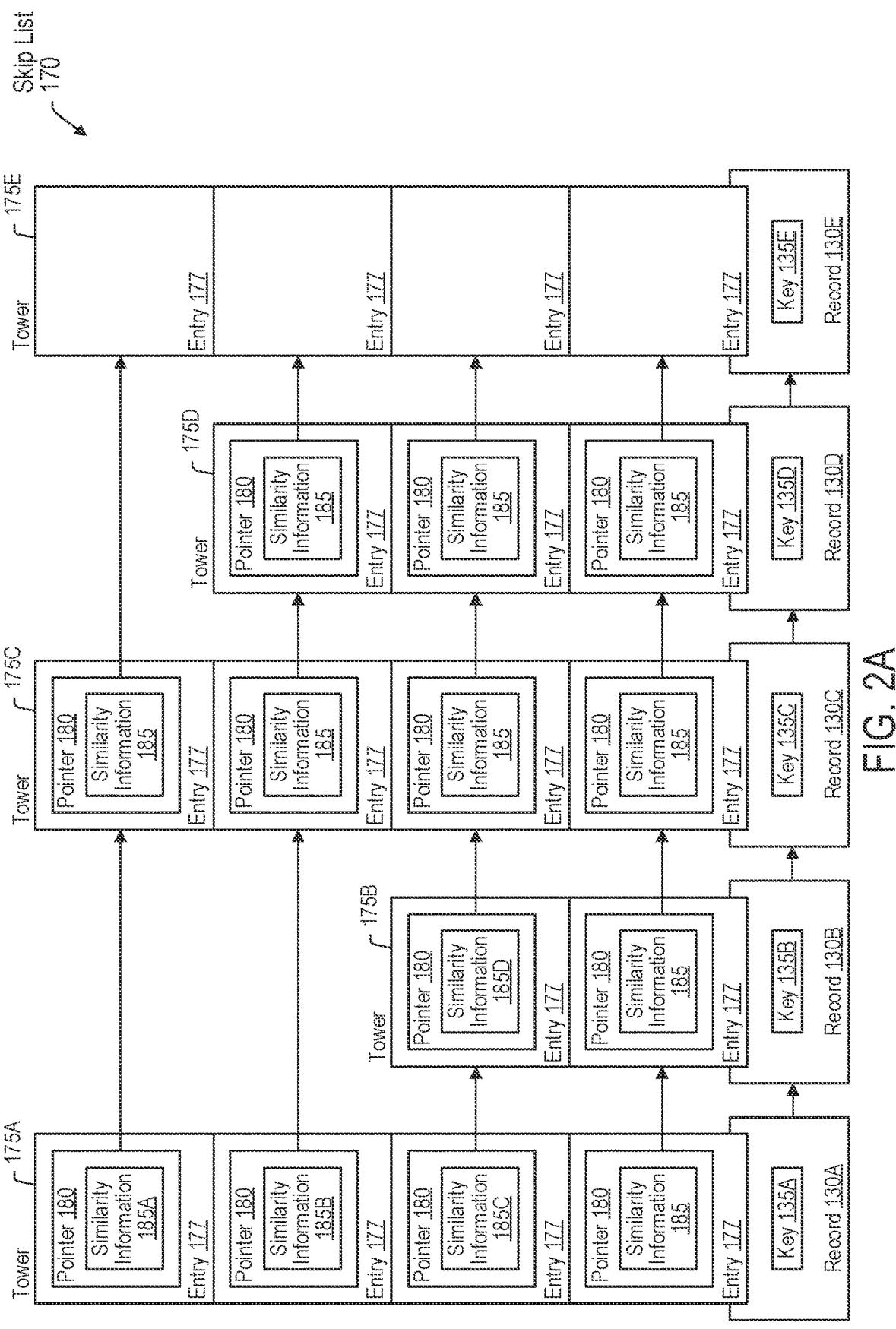
FIG. 2A is a block diagram illustrating an example skip list having pointers that store similarity information, according to some embodiments.

Turning now to FIG. 2A, a block diagram of an example skip list 170 having pointers 180 that store similarity information 185 is shown. In the illustrated embodiment, skip list 170 includes five towers 175A-E of varying depths-towers 175A, 175C, 175E having four levels, tower 175D having three levels, and tower 175B having two levels. Also as shown, each level of towers 175A-D includes a respective pointer 180 storing respective similarity information 185. As further shown, towers 175A-E are included in records 130A-E, respectively. Records 130A-E include keys 135A-E, respectively, and each record 130 points to the next record 130 in the series of records 130A-E (except for record 130E). The illustrated embodiment may be implemented differently than shown. For example, records 130A-E may store a pointer to the next record 130 and a pointer to the previous record 130 in key-sorted order such that records 130A-E can be traversed in both directions (i.e., 130A→130E and 130E→130A).

As discussed, in various embodiments, similarity information 185 indicates an amount of similarity between two keys 135. In the illustrated embodiment, the top level of tower 175A points to the top level of tower 175C, and the entry 177 of the top level of tower 175A includes a pointer 180 having similarity information 185A. Since that pointer 180 involves towers 175A and 175C, similarity information 185A indicates an amount of similarity between keys 135A and 135C of records 130A and 130C that store towers 175A and 175C, respectively. The next level of tower 175A also includes an entry 177 having a pointer 180 that points to tower 175C on the same level as that pointer 180, skipping over tower 175B since it does not have an entry 177 at that level. Thus, similarity information 185B of that pointer 180 is the same as similarity information 185A of the pointer 180 in the level above since they both point to the same tower 175 (and thus involve the same keys 135). The next level of tower 175A, however, includes an entry 177 having a pointer 180 that points to tower 175B. As such, similarity information 185C of the pointer 180 of that entry 177 indicates an amount of similarity between keys 135A and 135B of records 130A and 130B, respectively. The entry 177 in the same level of tower 175B stores similarity information 185D that indicates an amount of similarity between keys 135B and 135C of records 130B and 130C, respectively. Accordingly, in various embodiments, the similarity information 185 stored in entries 177 across skip list 170 can vary based on the tower 175 being pointed to (the target tower) and the tower 175 (the origin tower) having the entry 177 pointing to the target tower. While pointers 180 are shown as directly pointing to the next, applicable tower 175, pointers 180 may be indirect pointers that point to another location (e.g., a hash bucket) that in turn points to the record 130 storing the next, applicable tower 175, as discussed below.

Figure 2B:
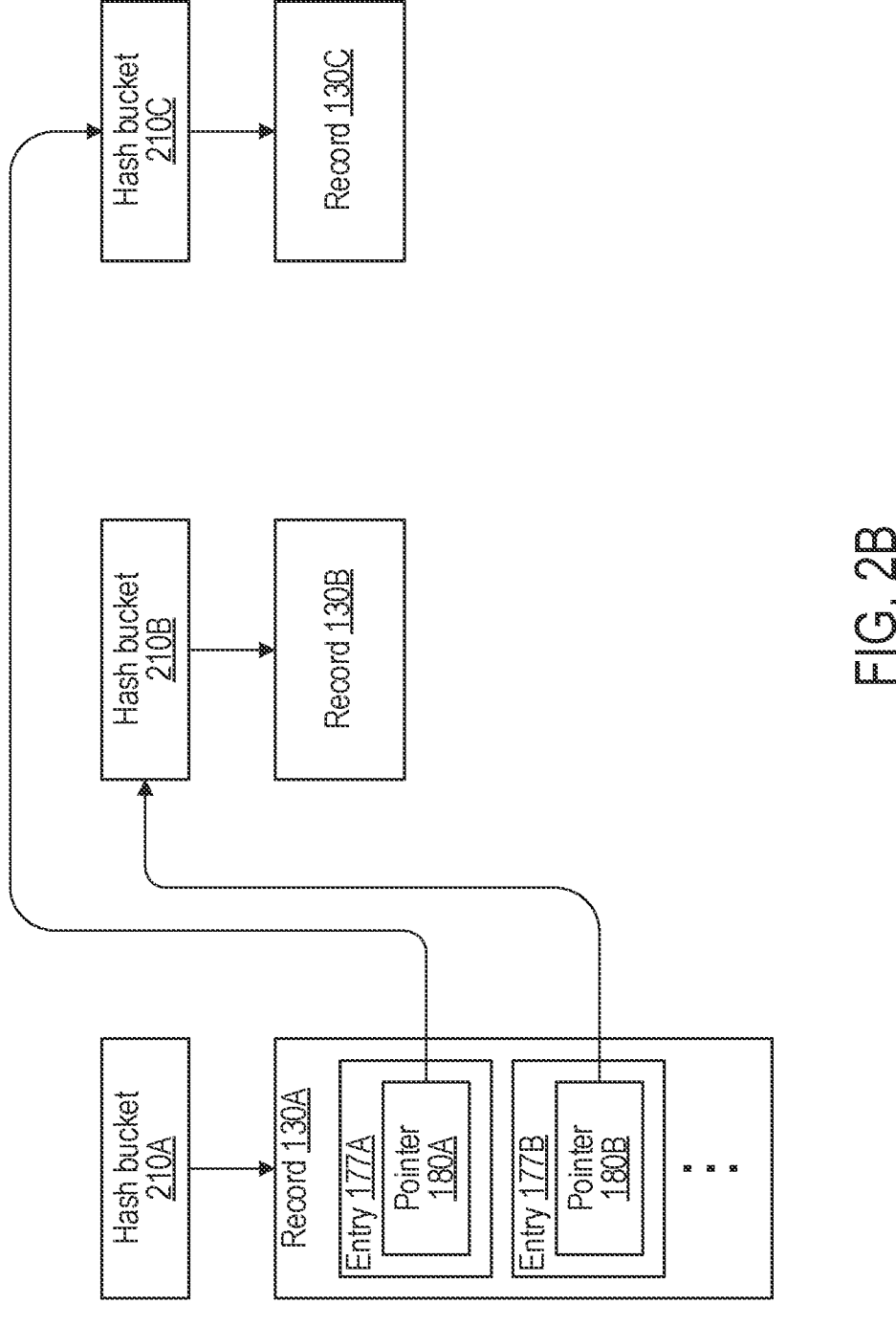
FIG. 2B is a block diagram illustrating an example traversal between records via indirect pointers, according to some embodiments.

Turning now to FIG. 2B, a block diagram of an example traversal between records 130 using indirect pointers 180 is shown. In the illustrated embodiment, there are records 130A-C coupled to hash buckets 210A-C, respectively. As shown, record 130A includes an entry 177A having a pointer 180A to hash bucket 210C and an entry 177B having a pointer 180B to hash bucket 210B—these entries 177 can correspond to different levels of a tower 175 whose data is included in record 130A. The illustrated embodiment may be implemented differently than shown—e.g., pointers 180A and 180B may point directly to records 130.

In various embodiments, a fixed amount of storage space is allocated for storing records 130 in in-memory cache 160. In such cases, when a record 130 is removed, other records 130 may be relocated in the fixed storage space to provide contagious storage space for new records 130. In some embodiments, pointers 180 are direct pointers to records 130 and thus specify a physical memory address where their respective record 130 is stored. When a record is moved in in-memory cache 160, pointers 180 that point to that record 130 have to be updated to reflect the new location of that record 130 (in the case that direct pointers 180 are used). This process may involve updating many pointers 180. Consider record 130C shown in FIG. 2A. If record 130C is moved, then four different pointers 180 have to be updated to reflect the new location of record 130C. For a large skip list 170, updating pointers 180 may take a long time, during which, access to that skip list 170 might be limited. To reduce the number of pointers 180 that are updated, in various embodiments, indirect pointers 180 are used.

An indirect pointer 180, in various embodiments, is a pointer that points to a location (e.g., a hash bucket 210 in the illustrated embodiment) that in turn points to the relevant record 130. Hash buckets 210 may be a part of a hash table, where each hash bucket 210 corresponds to an entry in the hash table and may be accessed by using a hash function on a bucket identifier to compute an index value to that entry. Accordingly, an indirect pointer 180 may identify the bucket identifier of the hash bucket 210 that stores a pointer to the record 130 that the indirect pointer 180 indirectly points to. As shown for example, pointer 180A indirectly points to record 130C by pointing to hash bucket 210C and similarly, pointer 180B indirectly points to record 130B by pointing to hash bucket 210B. Thus, in various embodiments, traversing from a first tower 175 to a second tower 175 involves accessing a hash bucket 210 via a pointer 180 and then accessing the record 130 storing the second tower 175 via that hash bucket 210. By using indirect pointers 180, only one pointer (the hash bucket pointer) may have to be updated when a record 130 is relocated in in-memory cache 160.

In embodiments in which similarity information 185 is not used but hash buckets 210 are used, determining whether to traverse from a first tower 175 to a second tower 175 involves obtaining information about the key 135 of the second tower 175. Obtaining that information involves acquiring a latch/lock on the hash bucket 210 that points to the record 130 storing the second tower 175, so that the key 135 can be read and also to prevent changes that affect that key 135 by another process. But in embodiments in which similarity information 185 is used, determining whether to traverse from a first tower 175 to a second tower 175 does not involve acquiring a latch/lock on the hash bucket 210 that is associated with the second tower 175 since database application 150 does not have to obtain the information about the second tower's key 135 in order to determine whether to traverse to the second tower 175. Accordingly, traversals of skip lists 170 that have similarity information 185 involve less latches than traversals of skip lists 170 that do not have similarity information 185.

Figure 3A:
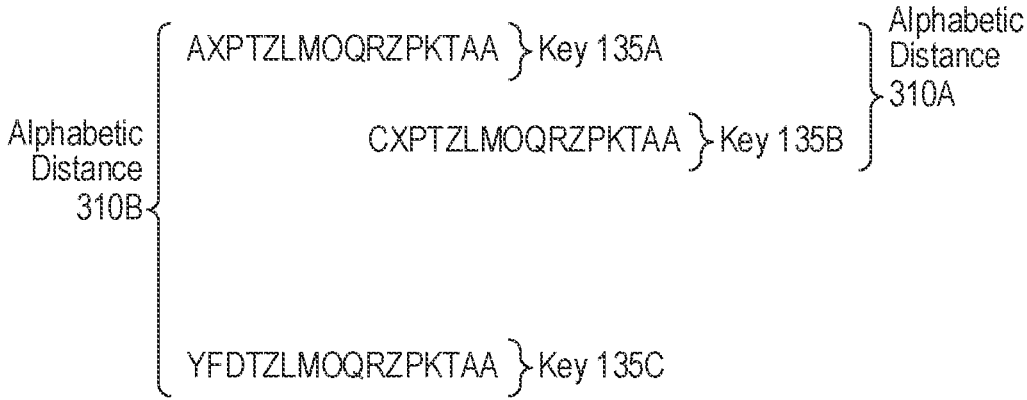
FIG. 3A is a block diagram illustrating example alphabetic distances between multiple keys, according to some embodiments.

Turning now to FIG. 3A, a block diagram of example alphabetic distances 310 between various keys 135. In the illustrated embodiment, there are keys 135A-C. As shown, key 135A has a value "AXPTZLMOQRZPKTAA," key 135B has a value "CXPTZLMOQRZPKTAA," and key 135C has a value "YFDTZLMOQRZPKTAA." Also as shown, there is an alphabetic distance 310A between keys 135A and 135B, and an alphabetic distance 310B between keys 135A and 135C. The illustrated embodiment may be implemented differently than shown—e.g., keys 135 may be alphanumeric strings, keys 135 may vary in length (e.g., keys 135A and 135C may be the same length while key 135B is shorter or longer), etc.

An alphabetic distance 310 between two keys 135, in various embodiments, represents how close (or far) the two keys 135 are alphabetically (or alphanumerically in some cases). As discussed below, an alphabetic distance 310 may be expressed as an offset value code having two values: an index value and a differing value. A comparison of alphabetic distance 310 can be used to determine which key 135 (between two keys 135) is closer to a particular key 135. In the illustrated embodiment for example, alphabetic distance 310A between keys 135A and 135B is shorter than alphabetic distance 310B between keys 135A and 135C since "C" is closer to "A" than "Y" is to "A" alphabetically. A comparison of similarity information 185 between keys 135A and 135B (that expresses alphabetic distance 310A) and similarity information 185 between keys 135A and 135C (that expresses alphabetic distance 310B) can be used, in various embodiments, to determine that key 135B is alphabetically closer to key 135A than key 135C is to key 135A (or alphanumerically in the case that keys 135 also include numbers). Based on this knowledge, database application 150 may determine whether to descend a tower 175 or to traverse to the next tower 175, as discussed in more detail with respect to FIG. 4.

Figure 3B:
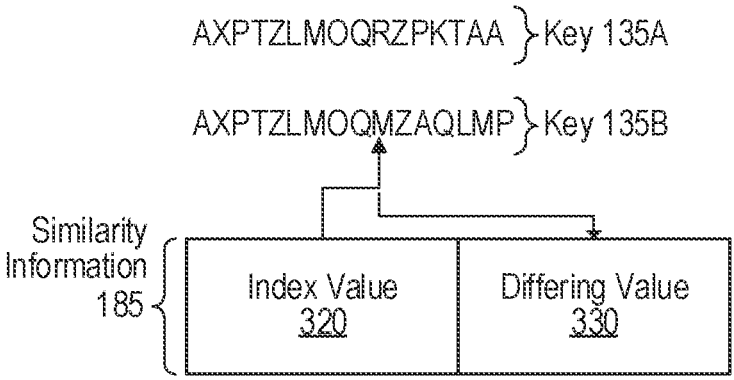
FIG. 3B is a block diagram illustrating example components of similarity information, according to some embodiments.

Turning now to FIG. 3B, a block diagram of similarity information 185 is shown. In the illustrated embodiment, similarity information 185 includes an index value 320 and a differing value 330. As further shown, there are keys 135A (with a value "AXPTZLMOQRZPKTAA") and 130B (with a value "AXPTZLMOQMZAQLMP"). The illustrated embodiment might be implemented differently than shown—e.g., keys 135A and 135B may be alphanumeric strings and/or have different lengths relative to each other.

As discussed, the alphabetic distance 310 between two keys 135 might be expressed as an offset value code included in similarity information 185. As shown, similarity information 185 includes index value 320 and differing value 330 that together form the offset value code. Index value 320, in various embodiments, identifies a position in a sequence of bytes (e.g., a sequence of characters) that corresponds to the first byte (character) that differs between two keys 135. As depicted for example, keys 135A and 135B differ at their $10^{th}$ character (i.e., "R" of key 135A versus "M" of key 135B) and thus index value 320 identifies the $10^{th}$ position. In some embodiments, index value 320 may identify a position corresponding to the last byte that is the same between two keys 135 (i.e., the $9^{th}$ position in the previous example). In either case, index value 320 is indicative of a sequence of characters, beginning from the first byte of two keys 135, that is the same between two keys 135. Accordingly, in the illustrated embodiment, index value 320 indicates that the sequence "AXPTZLMOQ" is the same between keys 135A and 135B. Differing value 330, in various embodiments, is the value of the byte, from the key 135 of the next/target tower 175, that differs between the keys 135 corresponding to the origin tower 175 and the target tower 175. Consider an example in which key 135A corresponds to a first tower 175 and key 135B corresponds to a second tower 175 and traversals move from the first tower 175 (the origin tower) to that second tower 175 (the target tower). In this example, differing value 330 is the value "M" of key 135B as that is the character occurring sequentially next after the sequence that matches between keys 135A and 135B.

In some embodiments, the key 135 of the target tower 175 may be stored in similarity information 185 instead of an offset value code. But keys 135 can be quite lengthy (e.g., over 256 bytes) and thus storing them in a pointer 180 may not be possible (e.g., if the pointer 180 is only 64 bits) or desirable. Further, string comparisons are more computationally expensive than integer comparisons. Accordingly, storing an offset value code (in the form of index value 320 and differing value 330) in similarity information 185 instead of the key of the target tower 175 can provide multiple advantages.

In various embodiments, index value 320 and differing value 330 are used to determine which key 135 (between two keys 135) is closer to a particular key 135. Consider an example in which there are three keys: a first tower key 135, a second tower key 135, and a search key 135. First similarity information 185 may be generated between the first and second tower keys 135 and also second similarity information 185 may be generated between the first tower key 135 and the search key 135. To determine whether the second tower key 135 is alphabetically closer to the first tower key 135 (i.e., has a shorter alphabetic distance 310) than the search key is to the first tower key 135, the index values 320 of the first and second similarity information 185 are compared. In various embodiments, an index value 320 identifying a larger positional value (e.g., $10^{th}$ position) than an index value that identifies a smaller positional value (e.g., $1^{st}$ position) means that the keys 135 associated with the former index value 320 are alphabetically more similar to each other than the keys 135 associated with that latter index value 320. As an example, if the index value 320 between the first tower key 135 and the second tower key 135 is "1" (indicating that those keys 135 differ at the first character/byte) and the index value 320 between the first tower key 135 and the search key 135 is "10" (indicating that those keys 135 differ at the tenth character/byte), then it can be determined that the search key 135 is closer to the first tower key 135 than the second tower key 135 is to the first tower key 135 as the search key 135 shares greater similarity with the first tower key 135 (the first nine characters of those keys 135 are the same).

If the index values 320 are the same, then a comparison between differing values 330 can be performed. In various embodiments, the key 135 associated with the differing value 330 that is alphabetically first relative to the differing value 330 of the other key 135 is considered closer to the particular key 135 to which those two keys 135 are being assessed. Consider an example in which the second tower key 135 has differing value 330 of "T" and the search key 135 has a differing value "L." Because "L" is alphabetically before "T," the search key 135 is closer to the first tower key 135. But if both the index values 320 match and the differing values 330 match, then database application 150 may access the record 130 of the second tower 175 in order to determine the full value of the second tower key 135. Database application 150 may compare the search key 135 and the second tower key 135 to determine whether to traverse to the second tower 175 or descend the first tower 175.

Figure 4:
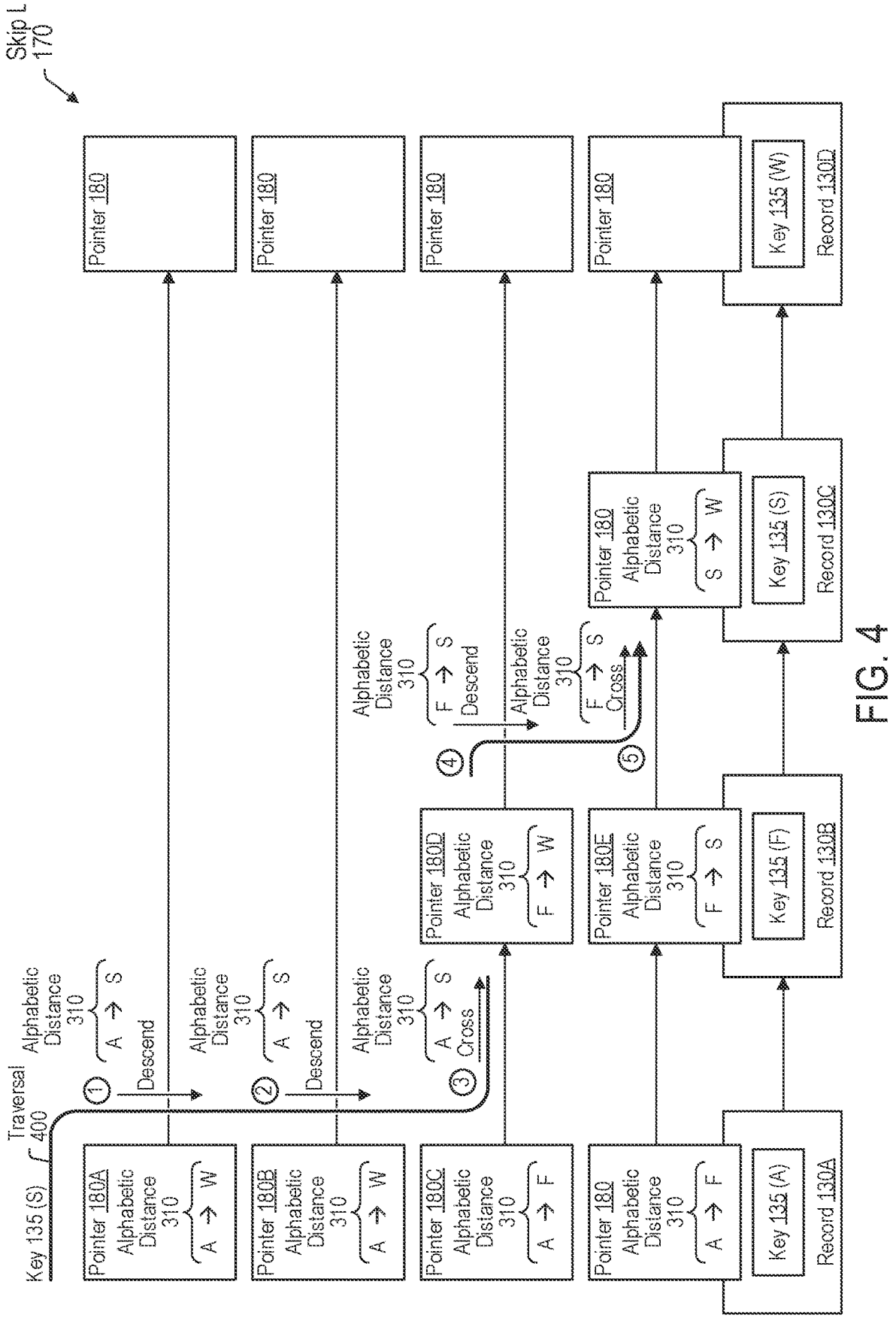
FIG. 4 is a block diagram illustrating an example traversal of a skip list to locate a record for a search key, according to some embodiments.

Turning now to FIG. 4, a block diagram of an example traversal of skip list 170 in order to locate a record 130 for a search key 135 is shown. In the illustrated embodiment, there are records 130A-D having corresponding towers. As further shown, the key 135 of record 130A has a value "A," the key 135 of record 130B has a value "F," the key 135 of record 130C has a value "S," and the key 135 of record 130D has a value "W." As shown, the search key 135 of a traversal 400 has a value "S." The illustrated embodiment may be implemented differently than shown. For example, records 130A-D may also include pointers that allow those records 130 to be traversed in the opposite direction than shown. Furthermore, to simplify FIG. 4, the alphabetic distances 310 that are represented by similarity information 185 in pointers 180 are shown in place of that similarity information 185.

In various embodiments, traversal 400 starts at the top level of the most left tower 175 of skip list 170—referred to as a sentinel tower. Database application 150 generates similarity information 185 between the search key 135 (S) and the key 135 (A) of record 130A and then compares that generated similarity information 185 (not shown) to similarity information 185 (also not shown) of pointer 180A. In response to determining that the alphabetic distance 310 between keys 135 (A) and (W) (represented as A→W) is greater than the alphabetic distance 310 between the key 135 (A) and the search key 135 (S) (represented as A→S) as indicated by the comparison, database application 150 descends the tower of record 130A to the next level, as shown. Database application 150 then compares the generated similarity information 185 to similarity information 185 (not shown) of pointer 180B and descend the current tower since the alphabetic distance 310 (A→W) is greater than the alphabetic distance 310 (A→S).

Thereafter, database application 150 compares the generated similarity information 185 to similarity information 185 (not shown) of pointer 180C. In response to determining that the alphabetic distance 310 between keys 135 (A) and (F) (represented as A→F) is less than the alphabetic distance 310 between key 135 (A) and search key 135 (S) (represented as A→S) as indicated by the comparison, database application 150 crosses to the tower of record 130B, as shown. Database application 150 generates new similarity information 185 between the search key 135 (S) and the key 135 (F) of record 130B and then compares that generated similarity information 185 to similarity information 185 (not shown) of pointer 180D. In response to the comparison, database application 150 descends the current tower since the alphabetic distance 310 (F→W) is greater than the alphabetic distance 310 (F→S). Database application 150 then compares that generated similarity information 185 to similarity information 185 (not shown) of pointer 180E. In response to the comparison, database application 150 crosses to the tower of record 130C since the alphabetic distance 310 (F→S) is equal to the alphabetic distance 310 (F→S). As a result, database application 150 has arrived at the record 130 that corresponds to the search key 135 (S). Database application 150 may traverse one or more records 130 in key-sorted order starting from record 130C.

Figure 5:
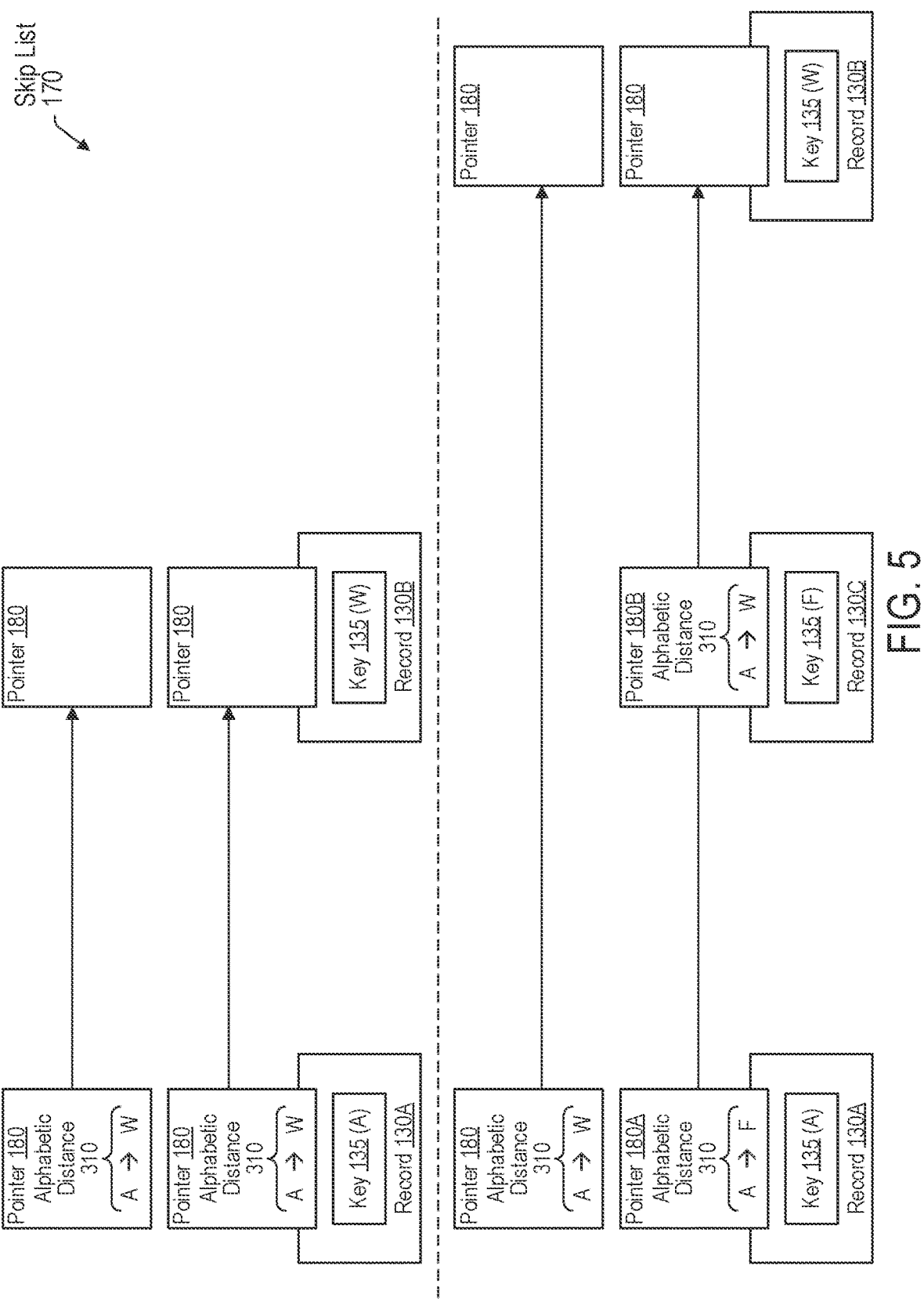
FIG. 5 is a block diagram illustrating an example insertion of a record and its tower into a skip list, according to some embodiments.

Turning now to FIG. 5, a block diagram of an example insertion of a record 130 and its tower 175 into skip list 170 is shown. In the illustrated embodiment, there are initially records 130A and 130B that include respective towers. During its operation, database application 150 may insert a record 130 into in-memory cache 160 and, as part of that insertion, add the record 130 to skip list 170. As shown, database application 150 adds record 130C to skip list 170 such that the tower of record 130C falls between the towers of records 130A and 130B since the key 135 (F) of record 130C is between the keys 135 (A) and (W) of records 130A and 130B. As a part of adding a record 130 to skip list 170, in various embodiments, database application 150 recomputes similarity information 185 for multiple pointers 180. In the illustrated embodiment, the similarity information of pointer 180A is recomputed based on the keys 135 (A) and (F) of records 130A and 130C, and the similarity information of pointer 180B is computed based on the keys 135 (F) and (W) of records 130C and 130B. While only one tower level is recomputed in the illustrated embodiment, in various cases, the tower inserted into skip list 170 has multiple levels and thus database application 150 may compute similarity information for pointers 180 across multiple towers and/or multiple levels.

Further, records 130 may be removed from skip list 170 (e.g., after those records 130 are flushed to LSM tree 120). Similarly to inserting a record 130, database application 150 may compute similarity information for pointers 180 across multiple towers and/or multiple levels. For example, if record 130C was subsequently removed and records 130A and 130B remained, then database application 150 recomputes the similarity information of pointer 180A based on the keys 135 (A) and (W) of records 130A and 130B. Accordingly, the similarity information of a pointer 180 may change throughout the life of that pointer 180 as records 130 are inserted and removed from in-memory cache 160.

Figure 6:
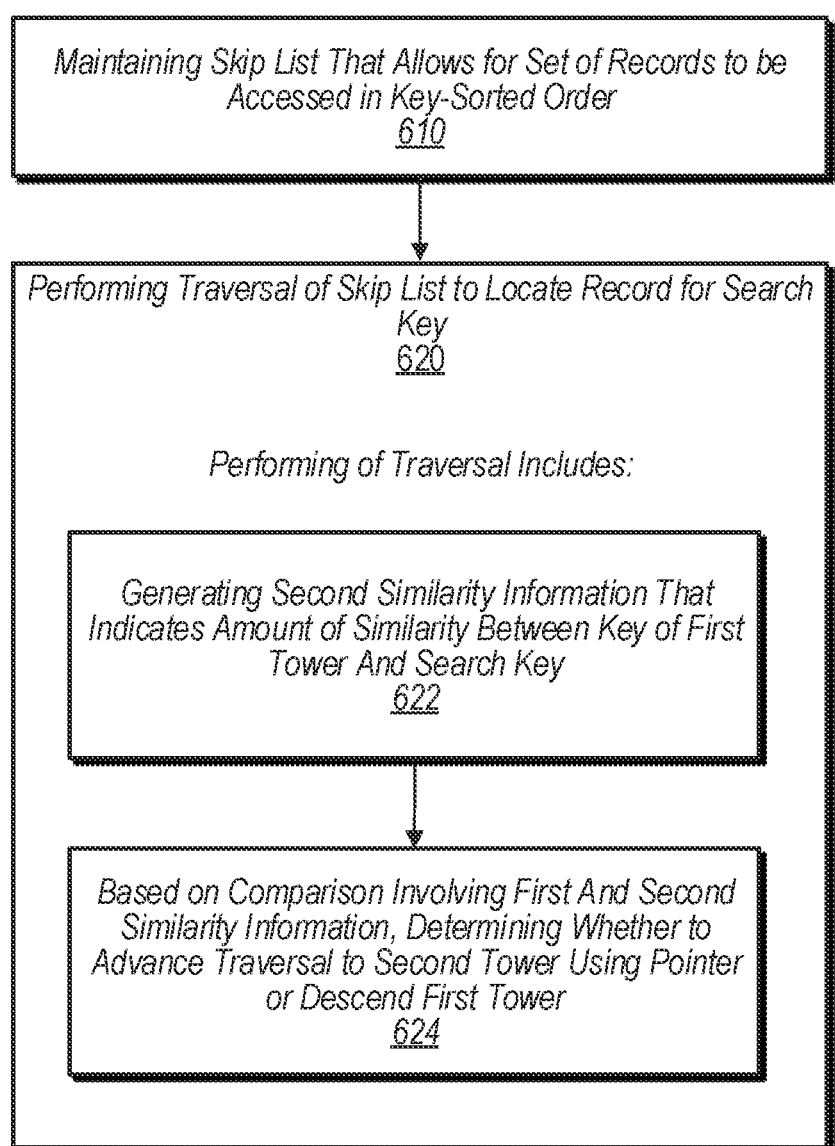
FIG. 6 is a flow diagram illustrating example method that relates to traversing a skip list to locate a record for a search key, according to some embodiments.

Turning now to FIG. 6, a flow diagram of a method 600 is shown. Method 600 is one embodiment of a method performed by a computer system (e.g., system 100) to traverse a skip list (e.g., skip list 170) to locate a record (e.g., a record 130) for a search key (e.g., a key 135). Method 600 may be performed by executing program instructions stored on a non-transitory computer-readable medium. Method 600 may also be performed as part of writing out one or more records from an in-memory cache (e.g., in-memory cache 160) to a storage repository. Method 600 may include more or less steps than shown. For example, method 600 may include a step in which a record is removed from the skip list and the skip list is updated to reflect that removal.

Method 600 begins in step 610 with the computer system maintaining a skip list that allows a set of records to be accessed in key-sorted order. The skip list includes a set of towers (e.g., towers 175) of varying depths and having entries (e.g., tower entries 177) storing pointers (e.g., pointers 180) to other towers. A first tower may include an entry at a particular depth that stores a pointer to access an entry of a second tower at the particular depth. The pointer includes first similarity information (e.g., similarity information 185) indicating an amount of similarity between a key of the first tower that is based on a record corresponding to the first tower and a key of the second tower that is based on a record corresponding to the second tower. In various embodiments, the set of records implements the skip list such that the first tower is stored as data in a first one of the set of records and the second tower is stored as data in a second one of the set of records.

In step 620, the computer system performs a traversal of the skip list to locate a record for a search key. As a part of performing of that traversal, in step 622, the computer system generates second similarity information that indicates an amount of similarity between the key of the first tower and the search key. In various embodiments, the amount of similarity that is indicated by the first similarity information corresponds to a first alphabetic distance (e.g., an alphabetic distance 310) between the key of the first tower and the key of the second tower. The first similarity information may comprise a first portion (e.g., index value 320) indicative of a first subsequence of a sequence of characters of the key of the first tower that matches a second subsequence of a sequence of characters of the key of the second tower and a second portion (e.g., differing value 330) that identifies a value of a differing character that occurs sequentially next after the second subsequence in the sequence of characters of the key of the second tower.

Based on a comparison involving the first and second similarity information, in step 624, the computer system determines whether to advance the traversal (e.g., traversal 400) to the second tower using the pointer or descend the first tower. The determining is performed without accessing the second tower to obtain key information about the key of the second tower. In response to the first alphabetic distance being greater than a second alphabetic distance between the key of the first tower and the search key as indicated by the comparison, the computer system descends the first tower to advance the traversal in place of using the pointer to access the second tower. In response to the first alphabetic distance not being greater than a second alphabetic distance between the key of the first tower and the search key as indicated by the comparison, the computer system accesses the second tower using the pointer to advance the traversal in place of descending the first tower.

In various embodiments, the first record is accessible via a first hash bucket (e.g., a hash bucket 210) and the second record is accessible via a second hash bucket. In various embodiments, the determining of step 624 is performed without acquiring a latch on the second hash bucket. Using the pointer to access the entry of the second tower can include accessing the second hash bucket via the pointer and subsequently accessing the second record storing the second tower via the second hash bucket.

The computer system may update the skip list to insert a third tower that resides between the first and second towers. In some cases, the third tower includes an entry at the particular depth. Accordingly, the updating can include the computer system generating third similarity information indicating an amount of similarity between the key of the first tower and a key of the third tower and then updating the pointer of the entry of the first tower to store the third similarity information in place of the first similarity information and to permit access to the third tower via the pointer. The computer system may update the skip list to remove the second tower. Accordingly, the updating can include the computer system generating third similarity information indicating an amount of similarity between the key of the first tower and a key of a third tower, the third tower having an entry at the particular depth. The computer system may then update the pointer of the first tower to store the third similarity information in place of the first similarity information and to permit access to the third tower via the pointer.

Exemplary Computer System

Figure 7:
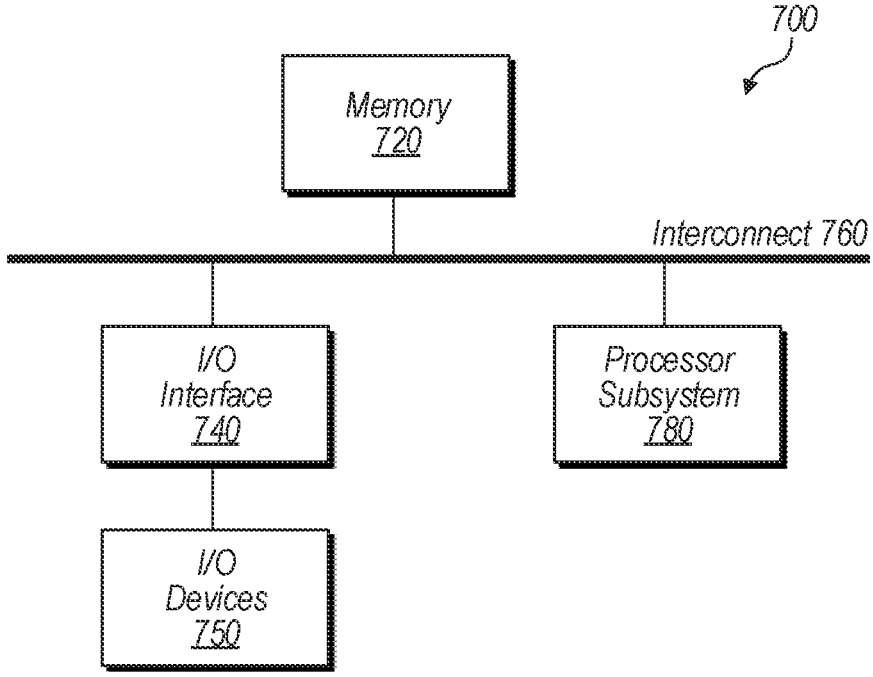
FIG. 7 is a block diagram illustrating elements of a computer system for implementing various systems described in the present disclosure, according to some embodiments.

Turning now to FIG. 7, a block diagram of an exemplary computer system 700, which may implement system 100, database 110, and/or database node 140, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may store program instructions executable by processor subsystem 780. In some embodiments, program instructions that when executed implement database application 150 and/or in-memory cache 160 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

storing, by a computer system, a set of records in a memory of the computer system in a non-key-sorted order;

maintaining, by the computer system, a skip list that allows for the set of records to be accessed from the memory in key-sorted order, wherein the skip list includes a set of towers of varying depths and having entries that store pointers to other towers, wherein a given one of the set of towers is a data structure in the skip list, and wherein a pointer at a particular depth of a first tower links the first tower to a second tower and stores a first encoded alphabetic distance representing a shared prefix length between a key of the first tower and a key of the second tower; and performing, by the computer system, a traversal of the skip list for a search key, wherein the performing includes:

generating a search alphabetic distance between the key of the first tower and the search key; and comparing the first encoded alphabetic distance and the search alphabetic distance to determine whether to advance the traversal to the second tower using the pointer or descend the first tower, wherein the comparing is performed without accessing the second tower to determine the key of the second tower.

2. The method of claim 1, further comprising:

in response to the first encoded alphabetic distance being greater than the search alphabetic distance as indicated by the comparing, the computer system descending the first tower to advance the traversal in place of using the pointer to access the second tower.

3. The method of claim 1, further comprising:

in response to the first encoded alphabetic distance not being greater than the search alphabetic distance as indicated by the comparing, the computer system accessing the second tower using the pointer to advance the traversal in place of descending the first tower.

4. The method of claim 1, wherein the first encoded alphabetic distance includes:

a first portion indicative of a first subsequence of a sequence of characters of the key of the first tower that matches a second subsequence of a sequence of characters of the key of the second tower; and a second portion that identifies a value of a differing character occurring sequentially next after the second subsequence in the sequence of characters of the key of the second tower.

5. The method of claim 1, wherein the set of records implements the skip list such that the first tower is stored as data in a first one of the set of records and the second tower is stored as data in a second one of the set of records.

6. The method of claim 5, wherein the first record is accessible via a first hash bucket and the second record is accessible via a second hash bucket, and wherein the comparing is performed without acquiring a latch on the second hash bucket.

7. The method of claim 5, wherein the second record is accessible via a hash bucket, wherein using the pointer to access the second tower includes accessing the hash bucket via the pointer and subsequently accessing the second record storing the second tower via the hash bucket.

8. The method of claim 1, further comprising:

updating, by the computer system, the skip list to insert a third tower that resides between the first and second towers, wherein the third tower includes an entry at the particular depth, and wherein the updating includes:

generating a second encoded alphabetic distance representing a shared prefix length between the key of the first tower and a key of the third tower; and updating the pointer to store the second encoded alphabetic distance in place of the first encoded alphabetic distance and to permit access to the third tower via the pointer.

9. The method of claim 1, further comprising:

updating, by the computer system, the skip list to remove the second tower, wherein the updating includes:

generating a second encoded alphabetic distance representing a shared prefix length between the key of the first tower and a key of a third tower, wherein the third tower includes an entry at the particular depth; and updating the pointer to store the second encoded alphabetic distance in place of the first encoded alphabetic distance and to permit access to the third tower via the pointer.

10. A non-transitory computer readable medium having program instructions stored thereon that are capable of causing a computer system to perform operations comprising:

storing a set of records in a memory of the computer system in a non-key-sorted order;

maintaining a skip list that allows for the set of records to be accessed from the memory in key-sorted order, wherein the skip list includes a set of towers of varying depths and having entries that store pointers to other towers, wherein a given one of the set of towers is a data structure in the skip list, and wherein a pointer at a particular depth of a first tower links the first tower to a second tower and stores an encoded alphabetic distance representing a shared prefix length between a key of the first tower and a key of the second tower; and performing a traversal of the skip list for a search key, wherein the performing includes:

generating a search alphabetic distance between the key of the first tower and the search key; and comparing the encoded alphabetic distance and the search alphabetic distance to determine whether to advance the traversal to the second tower using the pointer or descend the first tower, wherein the comparing is performed without accessing the second tower to determine the key of the second tower.

11. The non-transitory computer readable medium of claim 10, wherein the encoded alphabetic distance includes:

an index value identifying a last character of a first subsequence of a sequence of characters of the key of the first tower that matches a second subsequence of a sequence of characters of the key of the second tower; and a value corresponding to a differing character occurring sequentially next after the second subsequence in the sequence of characters of the key of the second tower.

12. The non-transitory computer readable medium of claim 11, wherein the operations further comprise:

in response to a comparison of the index value and an index value of the search alphabetic distance indicating that the encoded alphabetic distance is greater than the search alphabetic distance, descending the first tower to advance the traversal in place of using the pointer to access the second tower.

13. The non-transitory computer readable medium of claim 11, wherein the operations further comprise:

in response to a comparison of the index value and an index value of the search alphabetic distance indicating that the encoded alphabetic distance is not greater than the search alphabetic distance, accessing the second tower using the pointer to advance the traversal in place of descending the first tower.

14. The non-transitory computer readable medium of claim 10, wherein the set of records implements the skip list such that the first tower is stored as data in a first one of the set of records and the second tower is stored as data in a second one of the set of records, wherein the second record is accessible via a hash bucket, and wherein using the pointer to access the second tower includes accessing the hash bucket via the pointer and subsequently accessing the second record via the hash bucket.

15. A system, comprising:

at least one processor:

memory having program instructions that are stored thereon that are executable by the at least one processor to cause the system to perform operations comprising:

maintaining a skip list that allows for a set of records to be accessed in key-sorted order, wherein the skip list includes a set of towers of varying depths and having entries that store pointers to other towers, wherein a given one of the set of towers is a data structure in the skip list, and wherein a pointer at a particular depth of a first tower links the first tower to a second tower and stores an encoded alphabetic distance representing a shared prefix length between a key of the first tower and a key of the second tower; and performing a traversal of the skip list for a search key, wherein the performing includes:

generating a search alphabetic distance between the key of the first tower and the search key; and comparing the encoded alphabetic distance and the search alphabetic distance to determine whether to advance the traversal to the second tower using the pointer or descend the first tower, wherein the comparing is performed without accessing the second tower to determine the key of the second tower.

16. The system of claim 15, wherein the operations further comprise:

in response to the encoded alphabetic distance being greater than the search alphabetic distance as indicated by the comparing, descending the first tower to advance the traversal in place of using the pointer to access the second tower.

17. The system of claim 15, wherein the operations further comprise:

in response to the encoded alphabetic distance not being greater than the search alphabetic distance as indicated by the comparing, accessing the second tower using the pointer to advance the traversal in place of descending the first tower.

18. The system of claim 15, wherein the set of records implements the skip list such that the first tower is stored as data in a first one of the set of records and the second tower is stored as data in a second one of the set of records, wherein the first record is accessible via a first hash bucket and the second record is accessible via a second hash bucket, and wherein the comparing is performed with a latch acquired on the first hash bucket but not the second hash bucket.

* * * * *